L. M. DE MERITT & J. H. ZINK.
TANK CAR.
APPLICATION FILED DEC. 22, 1915.
1,237,484.
Patented Aug. 21, 1917.
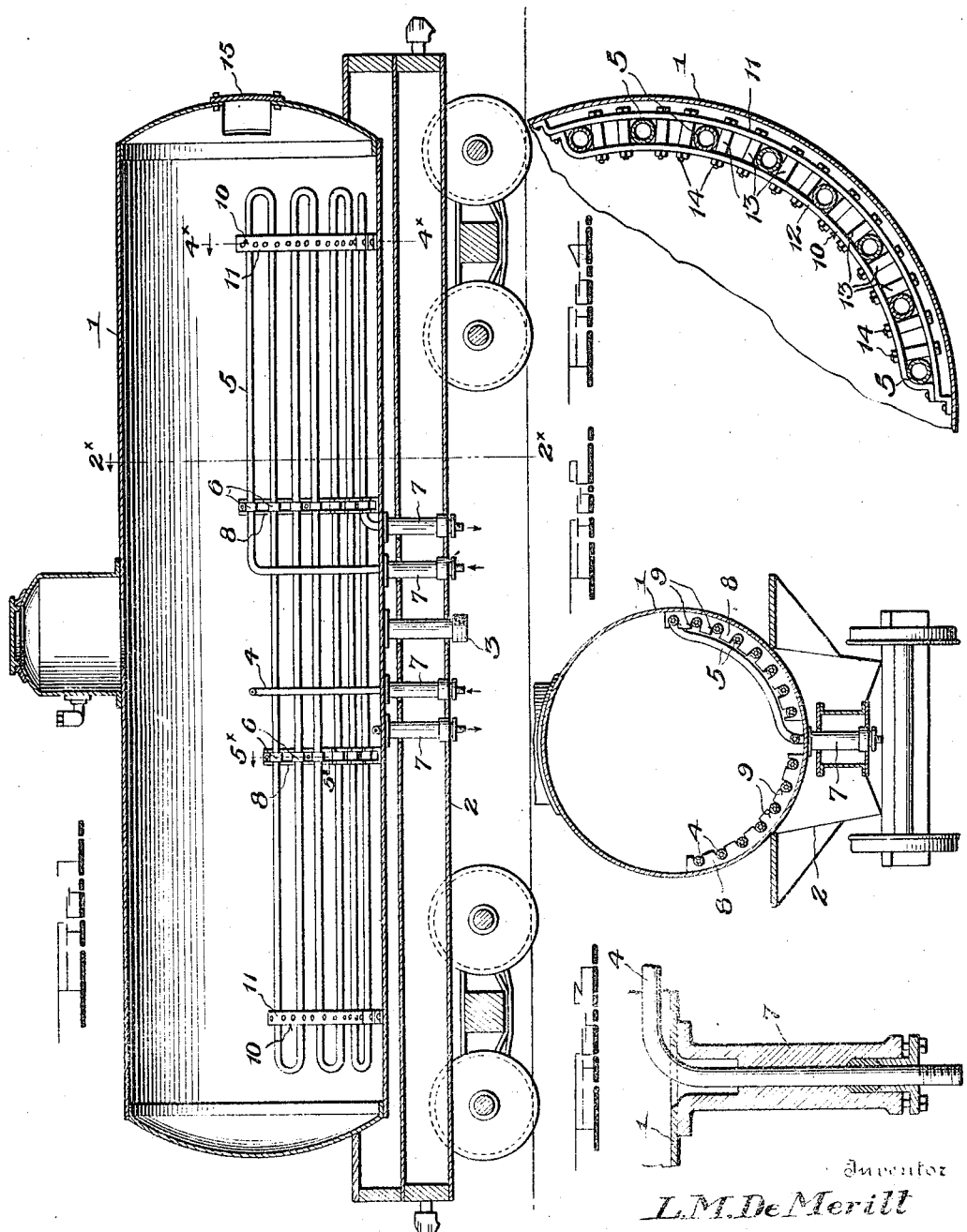
Inventor
L. M. De Meritt
and J. H. Zink,

UNITED STATES PATENT OFFICE.

LEONARD M. DE MERITT AND JOHN H. ZINK, OF BALTIMORE, MARYLAND.

TANK-CAR.

1,237,484.  Specification of Letters Patent.  Patented Aug. 21, 1917.

Application filed December 22, 1915. Serial No. 68,268.

*To all whom it may concern:*

Be it known that we, LEONARD M. DE MERITT and JOHN H. ZINK, citizens of the United States, residing at Baltimore city and State of Maryland, have invented certain new and useful Improvements in Tank-Cars, of which the following is a specification.

The object of this invention is to improve heating systems employed in tank cars for transporting heavy oils, asphalt, asphaltic products, petroleum products and the like, which do not flow easily at ordinary temperatures. In order to cause these products to flow more readily, tank cars for transporting them are generally equipped with steam coils located within the tank. The object of this invention is to render tank cars employing such heating systems free from leaks due to such employment, and consists, in one specific form, of the combination and arrangement of parts herein shown and described, the novel features being more particularly pointed out in the accompanying claim.

In order to more fully describe our invention, reference will be had to the accompanying drawings in which, Figure 1, is a central longitudinal vertical section of a tank car equipped with one form of our invention;

Fig. 2, a section on line $2^x$—$2^x$, Fig. 1;

Fig. 3, an enlarged detail vertical section of one of the stuffing boxes for the heating coils;

Fig. 4, a fragmentary detail sectional view showing one of the supporting frames at the ends of the coils.

Referring to the accompanying drawings, 1 represents a tank, and 2 the tank supporting structure of a tank car of the type hereinbefore referred to, and 3 the outlet through which the contents of the tank are withdrawn.

Within this tank are located two heating coils 4 and 5, on opposite sides of the tank. These coils are continuous within the tank; that is to say, they are of continuous or integral material and are entirely free of joints in the ordinary sense. If provided with couplings such as 6, these couplings are welded to the pipe sections proper so that they really become an integral part of the coil. By electrical welding processes now in common use, such welding may be readily effected. The ends of the coils extend through the bottom of the tank and terminate entirely outside thereof, such ends being provided with stuffing boxes 7, whereby leakage of the contents of the tank around the pipes at these points is prevented. The arrows at the ends of the heating coils beneath the tank in Fig. 1 indicate the inlets and outlets respectively. These coils are rigidly supported adjacent the stuffing boxes in supports 8, comprising flanged plates of U-shaped cross-section rigidly secured to the tank and having slots 9 in which the coils fit, and to which the same may be welded. Such rigid support prevents relative movement between the ends of the heating coils and the tank.

The coils are supported near the ends of the tank in frames 10 consisting each of a bracket 11 rigidly attached to the tank, and a top plate 12 secured to the bracket and passing over the coils, the said coils being held in position between said members of the frame by sleeves 13 on bolts 14.

In order to afford ready access to the coils within the tank, the latter is provided with a manhole 15 at one end.

It will be seen from the foregoing description that joints in the steam conducting means within the tank are entirely eliminated, which renders impossible the common weakness of leaky joints which permit the escape of steam into the contents of the tank. If the coils are in sections, these may be joined together by welded couplings, or butt welded, as desired. In either case the pipe becomes an integral or continuous structure, the essential idea being that there are no open joints.

Without limiting our invention to the specific details and disposition of coils here shown and described, what we claim is:—

The combination with the tank of a tank car, of an integral heating coil located for the greater portion of its length in said tank and having its ends wholly outside thereof, said ends passing through the bottom of said tank, stuffing boxes closing the openings in the tank through which the coil passes, and means rigidly supporting said coil adjacent said stuffing boxes and near the ends of the tank.

In testimony whereof we affix our signatures.

LEONARD M. DE MERITT.
JOHN H. ZINK.